United States Patent
Storey

(10) Patent No.: US 11,873,627 B2
(45) Date of Patent: Jan. 16, 2024

(54) REMOTE WATER SUPPLY AND TESTING DEVICE

(71) Applicant: Randy Storey, Miami Gardens, FL (US)

(72) Inventor: Randy Storey, Miami Gardens, FL (US)

(73) Assignee: Randy Lee Storey, Miami, FL (US)

( * ) Notice: Subject to any disclaimer, the term of this patent is extended or adjusted under 35 U.S.C. 154(b) by 149 days.

(21) Appl. No.: 17/300,539

(22) Filed: Aug. 6, 2021

(65) Prior Publication Data
US 2023/0044861 A1 Feb. 9, 2023

(51) Int. Cl.
*E03B 7/00* (2006.01)
*E03B 7/07* (2006.01)
*G01M 3/28* (2006.01)

(52) U.S. Cl.
CPC ............ *E03B 7/003* (2013.01); *E03B 7/07* (2013.01); *G01M 3/2815* (2013.01)

(58) Field of Classification Search
CPC .. E03B 7/00; E03B 7/003; E03B 7/07; G01M 3/00; G01M 3/28; G01M 3/2815
See application file for complete search history.

(56) References Cited

U.S. PATENT DOCUMENTS

| | | |
|---|---|---|
| 6,704,946 B1 | 3/2004 | Mueller et al. |
| 6,941,590 B2 | 9/2005 | Lim |

(Continued)

FOREIGN PATENT DOCUMENTS

KR  20130030654 A  *  3/2013  ............ G01M 3/28

OTHER PUBLICATIONS

"Accumeter" Amazon.com webpage (Year: 2022).*
"Yulikyn" Amazon.com webpage (Year: 2022).*
"Appollo" Amazon.com webpage (Year: 2022).*

*Primary Examiner* — Nguyen Q. Ha

(57) ABSTRACT

A portable apparatus that can be temporarily attached to plumbing angle stop valves and the like, for the purposes of: (i) providing a controlled supply of water for repair and construction operations in a building; and (ii) testing for leaks in plumbing systems. This invention consists of the following components as depicted in FIGS. 1 through 4. Control unit consists of manifold interconnected with valve. Gauge is mounted into gauge port. Inlet pipe is attached to inlet port via matching threaded ends. Posterior end of inlet hose connects to inlet pipe via supply fitting. Anterior end of inlet hose can be attached onto a plumbing angle stop valve via supply fitting; said fitting has circumferential finger grips to facilitate attachment/removal without tools. Outlet port has outlet pipe mounted via matching threaded ends; said pipe can be fabricated in a straight or curved configuration. Quick-disconnect snap coupler can be installed between inlet pipe and inlet fitting as an alternate connection means. Quick-disconnect snap coupler can also be installed between outlet pipe and outlet fitting as an alternate connection means. To use the device, all components are interconnected as described and valve handle is rotated to the closed position. Supply fitting is attached to outlet of closed stop valve. Opening stop valve pressurizes manifold, allowing plumbing water pressure measurement via the gauge. Opening valve handle allows water to flow through device and exit end fitting. Garden hose or implements can be attached to end fitting to extend range of supplied water or employ task-specific tools.

4 Claims, 2 Drawing Sheets

(56) References Cited

U.S. PATENT DOCUMENTS

| | | |
|---|---|---|
| 7,127,750 B2 | 10/2006 | Lim |
| 8,109,685 B1 | 2/2012 | Vito |
| 9,066,633 B1 | 6/2015 | Meriwether |
| 10,656,042 B2 | 5/2020 | Hart et al. |

\* cited by examiner

REMOTE WATER SUPPLY AND TESTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

NAMES OF THE PARTIES OF A JOINT RESEARCH AGREEMENT

Not Applicable

REFERENCE TO SEQUENCE LISTING, A TABLE OR A COMPUTER LISTING COMPACT DISK APPENDIX

Not Applicable

STATEMENT REGARDING PRIOR DISCLOSURES BY THE INVENTOR OR A JOINT INVENTOR

Not Applicable

BACKGROUND OF THE INVENTION

This invention pertains to devices that allow transfer of water to locations within a building to facilitate maintenance and repair operations. Obtaining a continuous supply of clean water for repair and construction projects within a building can present a challenge. It is often inconvenient or impossible to access a faucet within reach of the work area. Access can be restricted due to the water supply existing on a different room or floor than the work site.

Additionally, the condition of plumbing systems can be assessed by measuring and monitoring water pressure. However, it is impractical to read a pressure gauge at one location while opening water supply at a different location in a building. Accordingly, there is a need for an improved water delivery and plumbing test device which can overcome proximity limitations.

Prior art discloses inventions intended for taping and diverting plumbing water for other uses. U.S. Pat. Nos. 9,066,633 B1 and 7,127,750 B2 present personal hygiene devices that attach to a toilet water supply valve. The outflow is directed onto the genital/rectal areas of the user for cleansing. Although these consist of systems of hoses and a handheld control valve, they differ greatly from the claimed inventions because they are not configured for: testing of plumbing system pressure; providing irrigation for building maintenance/construction; attachment of water-driven tools or garden hoses to expand usability; and options for attaching hoses via snap couplers for increased usability.

BRIEF SUMMARY OF THE INVENTION

This invention consists of the following components as depicted in FIGS. 1 through 4. Control unit 102 consists of manifold 108 interconnected with valve 104. Gauge 122 is mounted into gauge port 120. Inlet port 150 has inlet pipe 132 mounted via matching threaded ends. Posterior end of inlet hose 106 connects to inlet pipe 132 via inlet fitting 146. Anterior end of inlet hose 106 can be attached onto a plumbing angle stop valve 126 via supply fitting 130. Supply fitting 130 has circumferential finger grips to facilitate attachment/removal without tools. Outlet port 116 has outlet pipe 134 mounted via matching threaded ends; said pipe can be fabricated in a straight or curved configuration. Quick-disconnect snap coupler 128 can be installed between inlet pipe 132 and inlet fitting 146 as an alternate connection means. Quick-disconnect snap coupler 128 can also be installed between outlet pipe 134 and outlet fitting 112 as an alternate connection means. To use the device, all components are interconnected as described and valve handle 138 is rotated to the closed position. Supply fitting 130 is attached to outlet of closed stop valve 126. Opening stop valve 126 pressurizes manifold 108, allowing plumbing water pressure measurement via gauge 122. Opening valve 104 via valve handle 138 allows water to flow through device and exit final fitting 114. Garden hose 140 or implements 142 can be attached to final fitting 114 to extend range of supplied water or employ task-specific tools.

Control unit 102, fabricated from a rigid non-permeable material, comprises valve 104 and manifold 108. Valve inlet port 148 is located at the anterior end of said valve 104 and valve outlet port 116 located at the posterior end of said valve 104. Manifold 108 features outlet port 118 at its posterior end which is rigidly connected to valve inlet port 148. Manifold inlet port 150 is located at the anterior end of manifold 108 and gauge port 120 within a side wall of manifold 108. As a result, all of said ports of manifold 108 converge within the hollow inner body of manifold 108. Manifold inlet port 150 and valve outlet port 116 feature threaded female terminal ends. Manifold pipe 132, featuring male-threaded terminal ends, is attached into manifold inlet port 150. Outlet pipe 134, featuring male-threaded terminal ends, is attached into valve outlet port 116.

BRIEF DESCRIPTION OF THE SEVERAL VIEWS OF THE DRAWING

The various features and advantages of the present technology may be more readily understood with reference to the following detailed description taken in conjunction with the accompanying drawings, wherein like reference numerals designate like structural elements.

DETAILED DESCRIPTION

Figure 1:
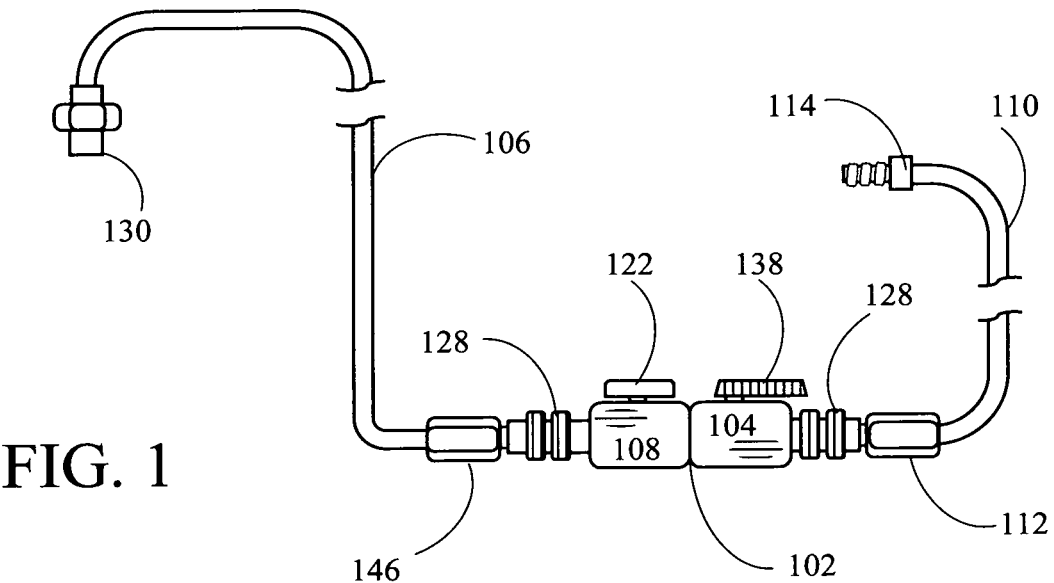
FIG. 1 is a side view of a device attached onto an angle stop valve.

The claimed device presents a portable apparatus that can be temporarily attached to plumbing angle stop valves for sinks and the like, for the purposes of: (i) providing a controlled supply of water to remote locations of a building for repair and construction operations; and (ii) testing for leaks in plumbing systems. In the preferred embodiment, the device claimed herein consists of the following as illustrated in FIGS. 1, 2, 3 and 4.

Inlet hose 106 is fabricated from a length of flexible non-permeable material, with an anterior end terminating in a rigidly attached female-threaded supply fitting 130 capable of watertight temporary attachment onto the threaded male outlet of a plumbing angle stop valve 126. Inlet hose 106 has a posterior end terminating in a rigidly attached threaded inlet fitting 146 capable of watertight interconnection with the aforementioned threaded terminal end of manifold inlet port 150. Outlet hose 110, fabricated from a length of flexible non-permeable material, has an anterior end terminating in an anterior end with rigidly attached threaded fitting 112 capable of watertight interconnection with the aforementioned threaded terminal end of valve outlet port 116. Posterior end of outlet hose 110 terminates with rigidly attached externally-threaded final fitting 114 which allows a garden hose or water-driven implements to be temporarily attached.

Gauge 122, which is rigidly attached to aforementioned gauge port 120, whereby gauge 122 provides pressure measurement of water supply plumbing pressure of water entering inlet hose 106. Quick-disconnect snap coupler 128 can be installed as an additional attachment means for outlet hose 110, whereby female-threaded snap anterior segment of snap coupler 128 can be attached onto terminal end of outlet pipe 134, while male-threaded posterior segment of snap coupler 128 can be attached into threaded outlet fitting 112 of outlet hose 110.

Quick-disconnect snap coupler 128 can also be installed as an additional attachment means for inlet hose 106, whereby female-threaded snap posterior segment of snap coupler 128 can be attached onto terminal end of inlet pipe 132, while male-threaded anterior segment of snap coupler 128 can be attached into terminal threaded inlet fitting 146 of inlet hose 106. Supply fitting 130 of inlet hose 106 features a circumferential finger grips of sufficient size and shape to facilitate expedient hand installation and removal without need for tools. External threads of final fitting 114 allows temporary watertight attachment of corresponding threaded connectors of a plurality of water-driven devices such as a garden hose 140, nozzles, brushes, plumbing stoppage jetters 142 and the like, thereby providing adaptation of claimed device to a range of tasks.

Figure 2:
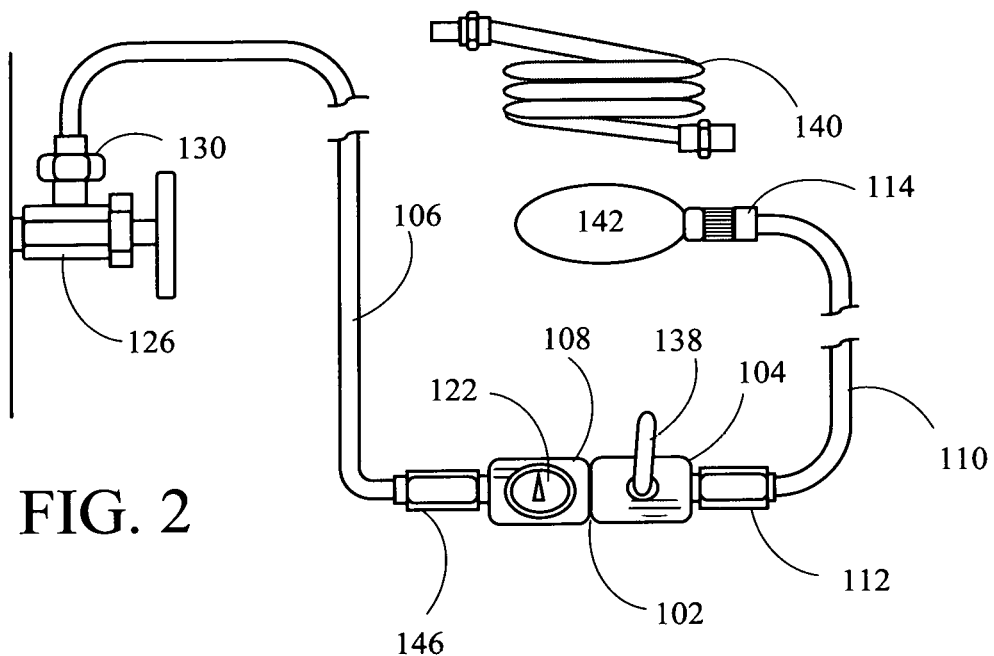
FIG. 2 illustrates perspective top view of the device
Figure 3:
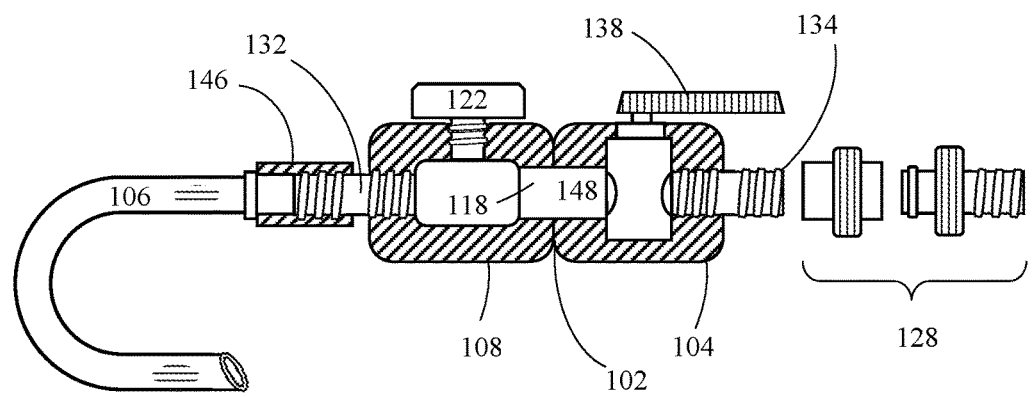
FIG. 3 depicts a cross-sectional side view of the manifold and valve bodies with valve in open position and inlet hose attached.
Figure 4:
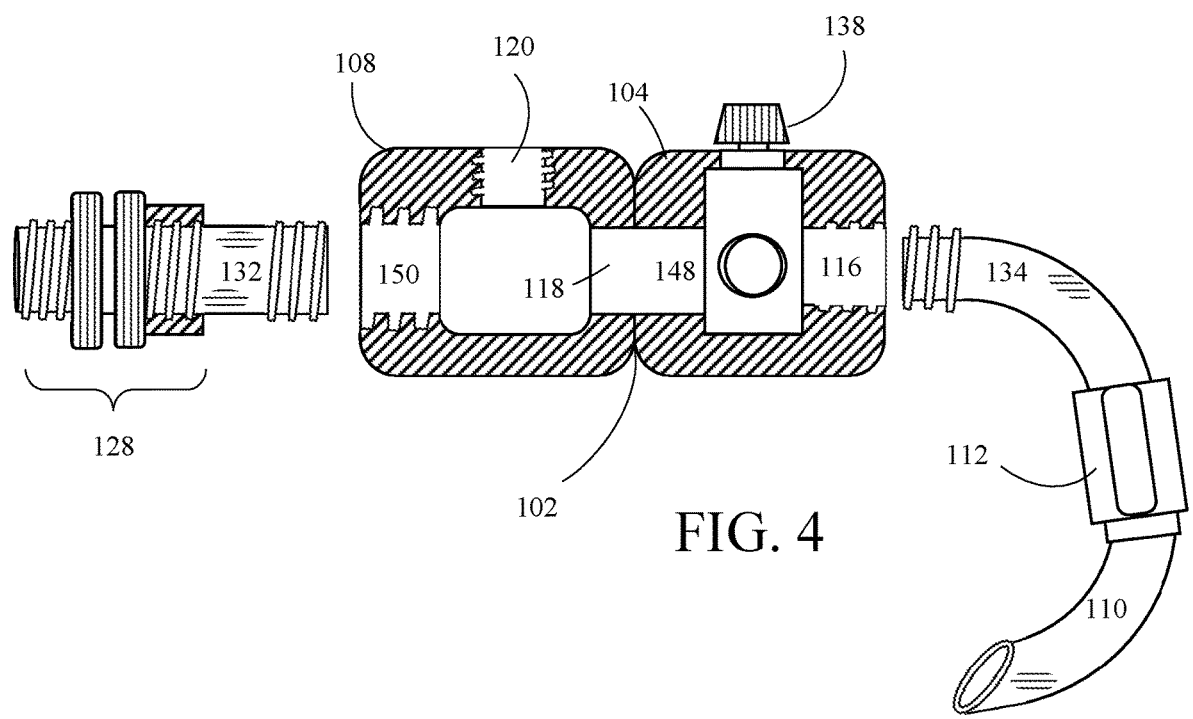
FIG. 4 depicts a magnified cross-sectional side view of the manifold and valve bodies with valve in closed position and curved outlet pipe.

To utilize the device, the aforementioned hoses and control unit 102 are interconnected as described, and supply fitting 130 is attachment onto a closed plumbing angle stop valve as depicted in FIG. 2. Valve 104 in also set to its closed position. Opening of the angle stop valve pressurizes manifold 108, thereby allowing condition of building plumbing system to be assessed via water pressure measurement provided by gauge 122. Rotation of valve handle 138 opens valve 108, allowing water to flow though the device and exit outlet hose 110. Lengths of said hoses allow device to reach locations that are distant from the water source. The capability of attaching garden hose 140 or the like onto outlet hose further extends this functional range.

It is to be understood that the embodiments as described above are presented to illustrate several of the plurality of specific embodiments and configurations. For example, the size and shape of the manifold, valve and valve handle can be manufactured differently than illustrated herein. Device can be configured to utilize screw-on or quick disconnect connector means, or a combination thereof, for the attachment of hoses. Various sizes and thread pitch can be employed for threaded sections, thereby allowing or restricting compatibility with other devices. Inlet pipe 132 and outlet pipe 134 can be configured as straight or curved (FIG. 4) to increase usability. Hoses can be manufactured in virtually any length to allow device to overcome distances from the water supply. Although a ball-type valve is depicted, other types of valves can be employed. As a result, this specification is no way presented to limit the scope of configuration and function of the claimed device.

Therefore, I claim:

1. A remote water supply and plumbing system testing device comprising:
   a valve with an inlet port located at the anterior end of the valve and an internally-threaded outlet port located at the posterior end of the valve;
   a manifold having an inner chamber, an internally-threaded inlet port located at the anterior end of the manifold, a gauge port disposed in a side wall of the manifold, and an outlet port located at the posterior end of the manifold, all of said ports of the manifold within the inner chamber of the manifold;
   an externally-threaded inlet pipe, attached at the posterior end thereof within the inlet port of the manifold;
   an externally-threaded outlet pipe, attached at the anterior end thereof within the outlet port of the valve;
   an inlet hose, having an anterior end terminating with an internally threaded primary fitting for attachment onto a threaded male outlet of a plumbing angle stop valve, and a posterior end terminating in a threaded fitting which connects to the aforementioned inlet pipe;
   an outlet hose having an anterior end terminating in a threaded secondary fitting connected to the outlet pipe, and a posterior end terminating with an externally threaded fitting; and
   a pressure gauge mounted to the gauge port.

2. The remote water supply and plumbing system testing device as recited in claim 1 further comprising:
   a snap coupler providing an alternative connection between the inlet hose and the manifold, including a male segment interlocking in the corresponding female segment, with the said segments each having a respective threaded terminal end;
   the female segment of the snap coupler having an internally threaded end connected onto the externally threaded inlet pipe; and
   the male segment of the snap coupler having an externally threaded end connected to the primary threaded fitting of the inlet hose.

3. The remote water supply and plumbing system testing device as recited in claim 1 further comprising:
   a snap coupler providing an alternative connection between the outlet hose and the valve, including a male segment interlocking in the secondary fitting;
   the female segment of the snap coupler having an internally threaded end connected onto the threaded outlet pipe;
   the externally threaded fitting of the outlet hose having threads for temporary attachment with the threaded connectors of various water-driven devices such as garden hoses, nozzles, brushes, plumbing stoppage jetters and the like; and the primary fitting of the inlet hose having a plurality of projections radiating around the circumference of its exterior surface.

4. A remote water supply and plumbing system testing device comprising:
   a valve having an inlet port and an outlet port;
   a manifold having an inner chamber, a threaded inlet port at first end of the manifold, a gauge port in a side wall of the manifold, and an outlet port at a second end of the manifold, all of said ports converge within the inner chamber, the outlet port of the manifold being attached to the inlet port of the valve;

a threaded inlet pipe having an end fixed to the inlet port of the manifold;

a threaded outlet pipe having an end fixed to the outlet port of the valve;

an inlet hose having an end terminating in a threaded primary fitting for attachment to a threaded outlet of a plumbing angle stop valve and a second end terminating in a threaded fitting connected to the inlet pipe;

an outlet hose, with an end terminating in a threaded secondary fitting attached onto the outlet pipe, and a second end terminating with a threaded fitting; and a pressure gauge mounted to the gauge port.

* * * * *